(12) United States Patent
Kawamura et al.

(10) Patent No.: US 11,958,129 B2
(45) Date of Patent: Apr. 16, 2024

(54) LASER PROCESSING DEVICE (71) Applicant: Nippon Telegraph and Telephone Corporation, Tokyo (JP)

(72) Inventors: Sohan Kawamura, Tokyo (JP); Tadayuki Imai, Tokyo (JP); Soichi Oka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 600 days.

(21) Appl. No.: 17/267,610

(22) PCT Filed: Aug. 22, 2019

(86) PCT No.: PCT/JP2019/032790
§ 371 (c)(1),
(2) Date: Feb. 10, 2021

(87) PCT Pub. No.: WO2020/050043
PCT Pub. Date: Mar. 12, 2020

(65) Prior Publication Data
US 2021/0276122 A1 Sep. 9, 2021

(30) Foreign Application Priority Data
Sep. 6, 2018 (JP) .................................. 2018-166630

(51) Int. Cl.
*G02B 26/08* (2006.01)
*B23K 26/00* (2014.01)
*B23K 26/046* (2014.01)
*B23K 26/064* (2014.01)
(Continued)

(52) U.S. Cl.
CPC ............ *B23K 26/064* (2015.10); *B23K 26/00* (2013.01); *B23K 26/046* (2013.01); *G02B 19/0009* (2013.01); *G02B 19/0047* (2013.01); *G02B 26/0816* (2013.01); *G02F 1/294* (2021.01)

(58) Field of Classification Search
CPC .... B23K 26/064; B23K 26/00; B23K 26/046; B23K 26/362; G02B 19/0009; G02B 19/0047; G02B 26/0816; G02B 26/06; G02B 19/0014; G02B 3/14; G02F 1/294
See application file for complete search history.

(56) References Cited

U.S. PATENT DOCUMENTS

2005/0230370 A1* 10/2005 Kameyama .......... B23K 26/384
235/462.46

FOREIGN PATENT DOCUMENTS

| JP | 2001293588 A | 10/2001 |
| JP | 2009012011 A | 1/2009 |
| JP | 2011173141 A | 9/2011 |

(Continued)

*Primary Examiner* — Euncha P Cherry
(74) *Attorney, Agent, or Firm* — Slater Matsil, LLP (57) ABSTRACT

On an optical path of a condensing lens (101), a varifocal lens (102) is disposed. The varifocal lens (102) is formed of an electro-optic crystal such as, e.g., potassium tantalate niobate. A condensation position measurement unit (103) measures a condensation position where laser light is condensed by the condensing lens (101). A condensation position control unit (104) controls a focal position of the varifocal lens (102) such that a difference between the condensation position measured by the condensation position measurement unit (103) and a prescribed condensation position that has been set falls within an acceptable range.

12 Claims, 5 Drawing Sheets

(51) Int. Cl.
*G02B 19/00* (2006.01)
*G02F 1/29* (2006.01)

(56) References Cited

FOREIGN PATENT DOCUMENTS

| | | | |
|---|---|---|---|
| JP | 2014206582 | A | 10/2014 |
| JP | 2015047612 | A | 3/2015 |
| JP | 5863568 | B2 | 2/2016 |

* cited by examiner

LASER PROCESSING DEVICE

CROSS-REFERENCE TO RELATED APPLICATIONS

This application is a national phase entry of PCT Application No. PCT/JP2019/032790, filed on Aug. 22, 2019, which claims priority to Japanese Application No. 2018-166630, filed on Sep. 6, 2018, which applications are hereby incorporated herein by reference.

TECHNICAL FIELD

The present invention relates to a laser processing device that performs rust removal or coating removal using laser light.

BACKGROUND

Material processing using laser light began around 1980. Currently, applications of laser processing have extended to a heavy industry field using laser light having a high output of several tens of kilowatts such as, mainly, cutting of a thick plate or welding. In processing using a high-output laser, an optical system in a laser processing device absorbs laser light to be heated and thermally expanded. The thermal expansion of the optical system causes a thermal lens effect by which characteristics of optical components, such as a lens, are changed. Consequently, an optical path length of the high-output laser light transmitted by the optical system changes to shift a position where the laser light emitted from a most downstream condensing lens in the laser processing device is condensed. As a result, a problem occurs in that a power density of the laser light applied to an object to be processed decreases to degrade processing efficiency.

To suppress such a problem due to the thermal lens effect, it can be considered to, e.g., increase a transmittance of each of optical elements and thus reduce light to be absorbed by the optical element. To suppress the problem described above, it can also be considered to inhibit thermal expansion of an optical system through cooling. To correct the problem described above, it can also be considered to, e.g., move the entire optical system when the position where the laser light is condensed is shifted.

Meanwhile, it can be considered that, in future years, an output of a laser to be used for processing further increases. For example, when a power of the laser output is doubled, a power absorbed by an optical system is also doubled. Consequently, by merely using a method which increases the transmittance of the lens, it is difficult to counteract the thermal lens effect when the laser output is increased.

Accordingly, a method to be used to suppress or correct the problem resulting from the thermal lens effect in the future is limited to a method which, e.g., enhances a cooling ability to suppress a temperature rise or moves an entire optical system. It is not so difficult to enhance the cooling ability or move the optical system. To enhance the cooling ability, a cooling device having high cooling performance such as a cooling water circulation device may be used appropriately. Even when a temperature of the optical system rises to 200° C., it is expected from simulation that a condensation position shifts by several millimeters. Therefore, the optical system may be mechanically moved appropriately only by the distance (see PTL 1 and PTL 2).

Citation List
Patent Literatures
PTL 1 Japanese Patent Application Publication No. 2001-293588
PTL 2 Japanese Patent No. 5863568

SUMMARY

Technical Problem

However, in µm-order fine processing using a high-output laser which is expected to be in demand in the future, a technique for precisely controlling a temperature of an optical system or a technique for precisely moving the optical system is required. Moreover, since a laser output constantly fluctuates and, in addition, an object to be processed as well as a laser processing device vibrates, to correct a condensation position, a fast feedback mechanism is required. For the feedback, an existing technique may be used appropriately but, even though fast feedback is provided, it is difficult to rapidly adjust a cooling ability or rapidly move the optical system in response thereto. Thus, when a higher-output laser is used in the related art, a problem arises in that it is not easy to perform finer processing.

Embodiments of the present invention are achieved to solve a problem as described above, and an object of embodiments of the present invention is to allow fine processing to be easily performed even when a higher-output laser is used.

Means for Solving the Problem

A laser processing device according to embodiments of the present invention includes: a condensing lens for condensing laser light supplied from a light source onto a surface of a structure to be processed to irradiate the surface of the structure to be processed; a varifocal lens disposed on an optical path of the condensing lens; a condensation position measurement unit that measures a condensation position where the laser light is condensed by the condensing lens; and a condensation position control unit that controls a focal position of the varifocal lens such that a difference between the condensation position measured by the condensation position measurement unit and a prescribed condensation position that has been set falls within a set acceptable range.

In the laser processing device described above, the varifocal lens is formed of an electro-optic crystal, and the condensation position control unit applies a voltage to the varifocal lens to control the focal position.

The laser processing device described above further may also include: an optical deflection unit that deflects an optical axis of the laser light incident on the varifocal lens; an optical-axis-displacement measurement unit that measures a displacement amount of the optical axis of the laser light incident on the varifocal lens; and a deflection amount control unit that controls an amount of the deflection caused by the optical deflection unit such that the displacement amount of the optical axis measured by the optical-axis-displacement measurement unit falls within a set acceptable range of the displacement amount.

The optical deflection unit is formed of a reflecting mirror having a variable angle, and the deflection amount control unit varies the angle of the reflecting mirror to control the amount of the deflection caused by the optical deflection unit. For example, the optical deflection unit is formed of a galvano mirror, and the deflection amount control unit applies a current to the optical deflection unit to control the amount of the deflection caused by the optical deflection unit. Alternatively, the optical deflection unit is formed of an electro-optic crystal, and the deflection amount control unit applies a voltage to the optical deflection unit to control the deflection amount.

Effects of Embodiments of the Invention

As described above, according to embodiments of the present invention, the varifocal lens is disposed over the optical path of the condensing lens. Therefore, even though a higher-output laser is used, an excellent effect of allowing fine processing to be performed is obtainable.

DETAILED DESCRIPTION OF ILLUSTRATIVE EMBODIMENTS

A description will be given below of a laser processing device in each of embodiments of the present invention.

First Embodiment

Figure 1:
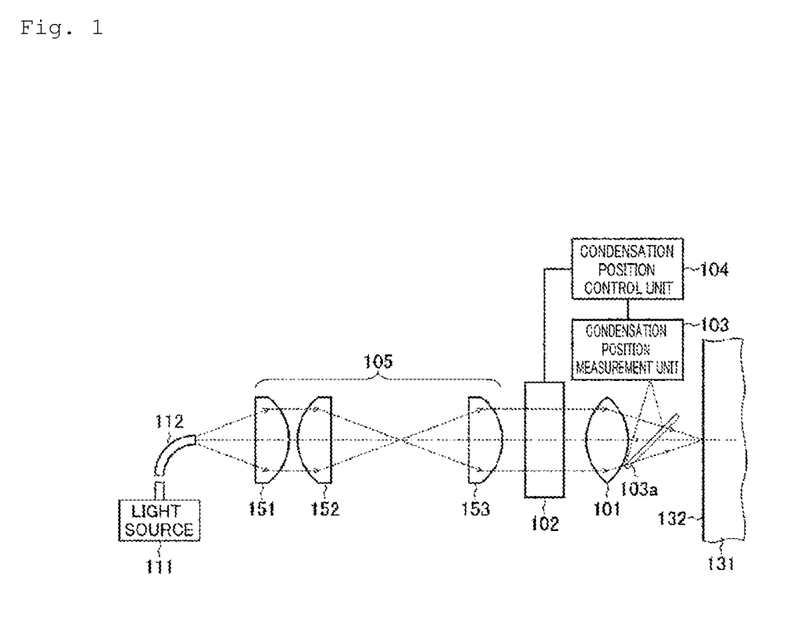
FIG. 1 is a configuration diagram illustrating a configuration of a laser processing device in a first embodiment of the present invention.

First, a description will be given of a laser processing device in the first embodiment of the present invention. The laser processing device includes a condensing lens 101, a varifocal lens 102, a condensation position measurement unit 103, a condensation position control unit 104, an optical system 105, and a light source 111.

The condensing lens 101 condenses laser light supplied from the light source 111 onto a to-be-processed surface 132 of a structure 131 to be processed to irradiate the to-be-processed surface 132 of a structure 131 to be processed. The laser light supplied from the light source 111 passes through an optical fiber 112 to be optically shaped by the optical system 105 and condensed by the condensing lens 101. For example, the optical system 105 uses a lens 151 and a lens 152 to adjust a beam diameter of the laser light emitted from the optical fiber 112 and uses a collimate lens 153 to collimate the laser light into parallel beams. The laser light thus collimated into the parallel beams are condensed by the condensing lens 101 to heat, e.g., an object to be processed.

The varifocal lens 102 is disposed on an optical path of the condensing lens 101. The varifocal lens 102 is formed of an electro-optic crystal such as, e.g., potassium tantalate niobate ($KTa_{1-x}Nb_xO_3$) and has a focal distance (focal position) that can be changed through a voltage application. The electro-optic crystal having an electro-optic effect (Kerr effect) rapidly operates in response to the applied voltage, has a high light transmittance, and is easy to cool.

For example, a single crystal of potassium tantalate niobate can be formed into the varifocal lens 102 using a secondary electro-optic effect (Kerr effect) which is observed in a paraelectric phase, and is therefore appropriate for a high-output laser processing device. The single crystal of potassium tantalate niobate is colorless and transparent.

By forming a multilayer dielectric film on a surface of the crystal, it is possible to increase a light transmittance to about 99% and inhibit a temperature rise due to absorption of laser light. In addition, since the single crystal is used, a heat conductivity is higher than that when another principle is used, and efficient cooling is possible. Furthermore, since the Kerr effect is used, a response time is as short as a millisecond or less, and therefore the varifocal lens 102 is capable of providing fast feedback.

Note that the varifocal lens 102 may be disposed appropriately at an optimal position depending on each of optical systems. In FIG. 1, the varifocal lens 102 is disposed immediately before the condensing lens 101 on the optical path of the laser light. The position of the varifocal lens 102 is not limited thereto. For example, the varifocal lens 102 may also be disposed immediately after the condensing lens 101 on the optical path of the laser light. The number of the varifocal lenses 102 is not limited to one, and it may also be possible to use a plurality of the varifocal lenses 102. Depending on a use purpose of the processing, a varifocal lens such as a so-called liquid crystal lens may also be used as the varifocal lens 102.

The condensation position measurement unit 103 measures a condensation position of the laser light condensed by the condensing lens 101. For example, the condensation position measurement unit 103 uses the light extracted by a semireflecting mirror 103a to measure the condensation position where condensation is caused by the condensing lens 101. The condensation position measurement unit 103 includes, e.g., a two-dimensional image sensor, and measures the condensation position on the basis of an area of a beam diameter imaged by the image sensor. The condensation position measurement unit 103 is not limited to the form described above. A focus control mechanism to be used for a well-known autofocus mechanism or the like may also be used as the condensation position measurement unit 103.

The condensation position control unit 104 controls the focal position of the varifocal lens 102 such that a difference between the condensation position measured by the condensation position measurement unit 103 and a prescribed condensation position that has been set falls within a set acceptable range. For example, when the varifocal lens 102 is formed of an electro-optic crystal, the condensation position control unit 104 applies a voltage to the varifocal lens 102 to control the focal position.

For example, the condensation position control unit 104 stores, as the prescribed condensation position, the condensation position measured by the condensation position measurement unit 103 immediately after the use of the present device was started. Thereafter, when the thermal lens effect is observed as a result of continuous use of the device, the condensation position where condensation is caused by the condensing lens 101 shifts. At this time, the condensation position control unit 104 shifts (controls) the focal position of the varifocal lens 102 such that a difference between the condensation position measured by the condensation position measurement unit 103 and the prescribed condensation position described above is zero. By the control, even when the thermal lens effect is observed, the initial focal position is maintained.

According to the first embodiment described above, by using, e.g., a laser having a higher output, even when the thermal lens effect is observed, a shift of the position where laser light is condensed is inhibited. In addition, by using the varifocal lens 102, the condensation position can rapidly be corrected. Therefore, according to the first embodiment, even when the higher-output laser is used, fine processing can easily be performed.

Figure 2:
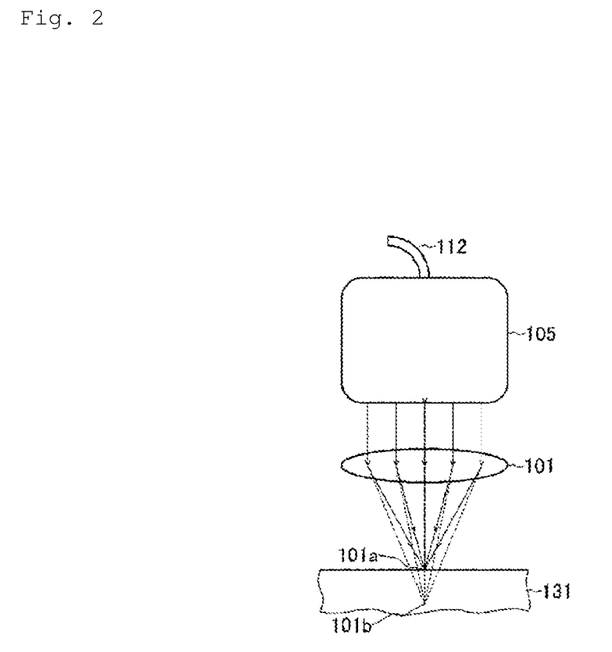
FIG. 2 is an illustrative view for illustrating displacement of a focal position due to a thermal lens effect.
Figure 3:
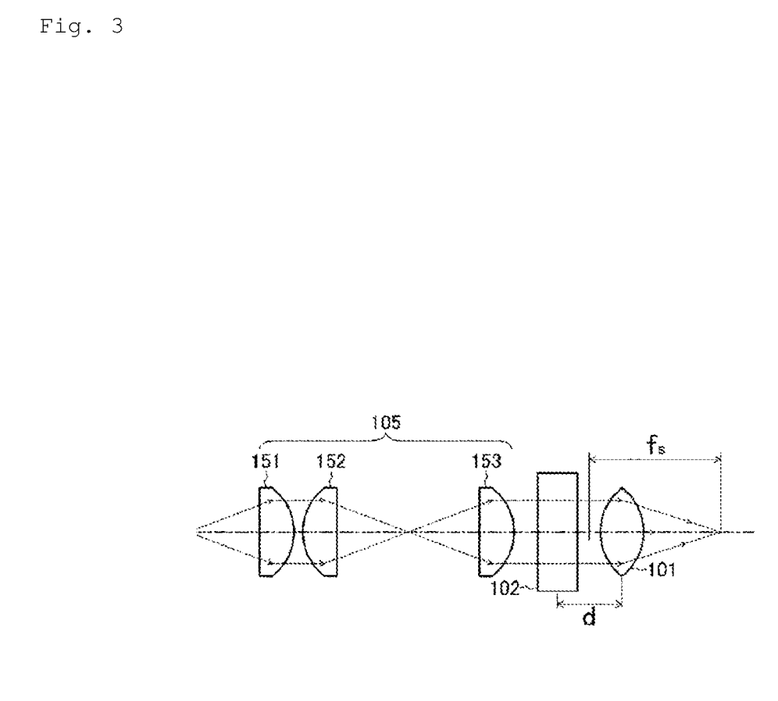
FIG. 3 is a configuration diagram illustrating a portion of an optical system extracted therefrom in the first embodiment.

A description will be given herein of the thermal lens effect. When an optical system absorbs laser light and a temperature thereof rises, an optical element is thermally expanded to change a characteristic such as a focal distance. As illustrated in FIG. 2, a position where the laser light is condensed shifts from a condensation position 101a to a condensation position 101b. Note that FIG. 3 is obtained by extracting a portion of the laser processing device illustrated in FIG. 1. This state is simulated using the optical system illustrated in FIG. 3 as a model. When a temperature of the entire optical system rises to 200° C., the condensation position is more distant by about 2 mm from the optical system. It is calculated that, depending on the optical system, a shift amount of the condensation position described above differs, and the shift amount reaches about 1 to 5 mm.

To correct the shift of the focal position due to the thermal lens effect, in embodiments of the present invention, the varifocal lens 102 is used. It is assumed that, in a state where there is no thermal lens effect, a focal distance of the varifocal lens 102 is f1 and a focal distance of the condensing lens 101 is f2. It is also assumed that a distance between the varifocal lens 102 and the condensing lens 101 is d. From a formula of a composite focal distance of two lenses "fS=f1×f2/(f1+f2−d)", a composite focal distance fS at a room temperature can be calculated.

A consideration is given to a case where, while processing is performed using a high power laser, a condensation position shifts by A mm at a time t1. First, on the assumption that the varifocal lens 102 is sufficiently cooled and the focal distance f1 is invariable, a focal distance f2' of the condensing lens 101 changed by the thermal lens effect is calculated on the basis of fS'=fS+A for the composite focal distance. Then, a focal distance f1' of the varifocal lens 102 required to correct the composite focal distance to the original focal distance fS is calculated, and the focal distance of the varifocal lens 102 is changed to f1'. When the varifocal lens 102 is formed of potassium tantalate niobate, by changing a voltage applied thereto, the focal distance is set to f1'. Note that a method of measuring the shift amount of the condensation position described above and a mechanism of feedback control may be selectively used appropriately depending on a use purpose thereof.

By way of example, a description will be given of a result of performing material processing using 20 kW laser light. For this processing, a processor used the varifocal lens 102 formed of potassium tantalate niobate. The focal distance of the condensing lens 101 was 50 mm, and the distance between the condensing lens 101 and the varifocal lens 102 was 10 mm. A voltage was applied such that the focal distance of the varifocal lens 102 was 4000 mm. During a period of about 10 minutes after the processing was started, a displacement of the condensation position as large as a maximum of 2 mm was measured. By contrast, in the laser processing device according to the first embodiment, the feedback control changed the focal distance of the varifocal lens 102 from 4000 mm to 40 mm to allow the processing to be successfully ended, while constantly holding the condensation position in an initial state.

Second Embodiment

Figure 4:
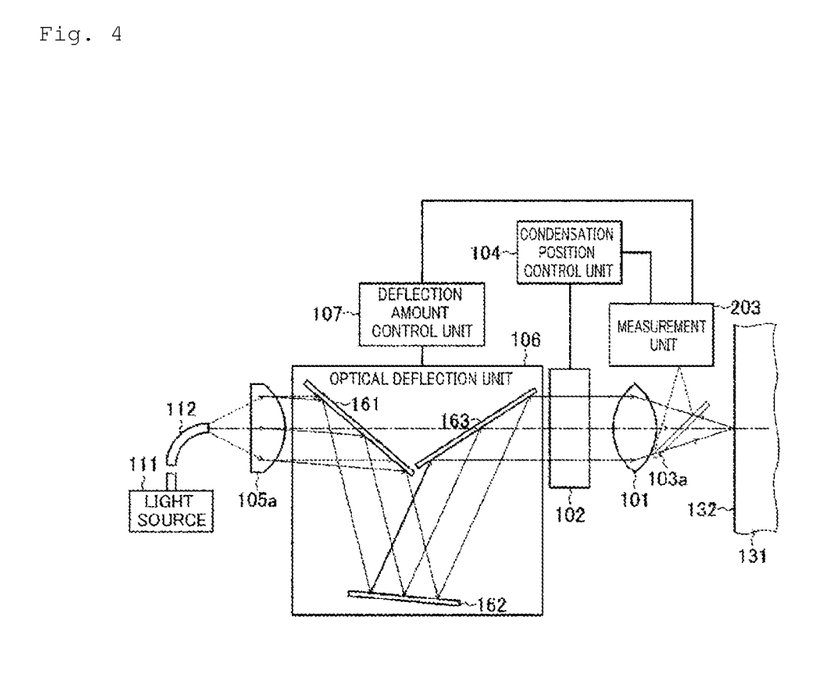
FIG. 4 is a configuration diagram illustrating a configuration of a laser processing device in a second embodiment of the present invention.

Next, referring to FIG. 4, a description will be given of a laser processing device in the second embodiment of the present invention. The laser processing device includes the condensing lens 101, the varifocal lens 102, a measurement unit 203, the condensation position control unit 104, the optical system 105, and the light source 111. The laser processing device also includes an optical deflection unit 106 and a deflection amount control unit 107.

The condensing lens 101 condenses laser light supplied from the light source 111 onto the to-be-processed surface 132 of the structure 131 to be processed to irradiate the to-be-processed surface 132 of a structure 131 to be processed. The laser light supplied from the light source 111 passes through the optical fiber 112 to be optically shaped (into parallel beams) by a collimate lens 105a serving as an optical system and condensed by the condensing lens 101.

The varifocal lens 102 is disposed on an optical path of the condensing lens 101. The varifocal lens 102 is formed of, e.g., potassium tantalate niobate.

The optical deflection unit 106 deflects an optical axis of the laser light incident on the varifocal lens 102. In the second embodiment, the optical deflection unit 106 is configured to include reflecting mirrors 161, 162, and 163 having variable angles. The reflecting mirrors 161, 162, and 163 are optical deflectors such as, e.g., galvano mirrors. The optical deflection unit 106 may also be configured to include an optical deflector such as a polygon mirror.

The measurement unit 203 has a function of the condensation position measurement unit 103 in the first embodiment described above. In addition, the measurement unit 203 also has a function of an optical-axis-displacement measurement unit that measures a displacement amount of the optical axis of the laser light incident on the varifocal lens 102. For example, the measurement unit 203 uses the light extracted using the semireflecting mirror 103a to measure a condensation position where condensation is caused by the condensing lens 101 and also measure the displacement amount of the optical axis. The measurement unit 203 includes, e.g., a two-dimensional image sensor, and measures the condensation position on the basis of an area of a beam diameter imaged by the image sensor. The measurement unit 203 also measures the displacement amount of the optical axis of the laser light on the basis of a position where the beam diameter was imaged by the image sensor.

The condensation position control unit 104 controls a focal position of the varifocal lens 102 such that a difference between the condensation position measured by the measurement unit 203 and a prescribed condensation position that has been set falls within a set acceptable range in the same manner as in the first embodiment described above.

The deflection amount control unit 107 controls an amount of deflection caused by the optical deflection unit 106 such that the displacement amount of the optical axis measured by the optical-axis-displacement measurement unit falls within a set acceptable range of the displacement amount. For example, the deflection amount control unit 107 varies the respective angles of the reflecting mirrors 161, 162, and 163 to control the amount of deflection caused by the optical deflection unit 106. When the reflecting mirrors 161, 162, and 163 are galvano mirrors, the deflection amount control unit 107 applies a current to the galvano mirrors to vary the angles of the reflecting mirrors 161, 162, and 163 and thereby control the amount of deflection caused by the optical deflection unit 106.

The thermal lens effect may not only vary a focal distance, but also incline the laser light from the optical axis only at a given angle θ. Due to the phenomenon of displacement of the optical axis, the condensation position is not located on the optical axis, and the laser light can no longer be condensed at an intended position. By contrast, by using the optical deflection unit 106, the laser light can be returned onto the optical axis to be parallel with the optical axis.

In the second embodiment, by way of example, the galvano mirrors are used. The galvano mirrors are capable of kHz-order operations and can momentarily respond to feedback control. In the second embodiment, the three galvano mirrors are used to be included in the optical deflection unit 106 and return the laser light incident on the varifocal lens 102 onto the optical axis in parallel relation with the optical axis.

According to the second embodiment described above, in the same manner as in the first embodiment described above, by using, e.g., a higher-output laser, even when the thermal lens effect is observed, a shift of the position where the laser light is condensed is inhibited. Additionally, by using the varifocal lens 102, the condensation position can rapidly be corrected. Therefore, even when the higher-output laser is used in the second embodiment, fine processing can easily be performed. Moreover, it is also possible to inhibit displacement of the optical axis due to the thermal lens effect and perform more precise control of a processing position.

By way of example, a description will be given of a result of performing material processing using 20 kW laser light. In the processing, the varifocal lens 102 made of potassium tantalate niobate was used. A focal distance of the condensing lens 101 is 50 mm, and a distance between the condensing lens 101 and the varifocal lens 102 is 10 mm. In addition, a voltage was applied such that the focal distance of the varifocal lens 102 was 4000 mm.

To deflect the laser light incident on the varifocal lens 102 and correct the optical axis displacement, the optical deflection unit 106 including the three galvano mirrors, the varifocal lens 102, and the condensing lens 101 were arranged in this order.

During a period of about 10 minutes after the processing was started, a displacement amount of the condensation position as large as a maximum of 2 mm was measured. By contrast, in the laser processing device according to the second embodiment, the feedback control changed the focal distance of the varifocal lens 102 from 4000 mm to 40 mm to allow the processing to be successfully ended, while constantly holding the condensation position in an initial state. In addition, during the period of about 10 minutes after the processing was started, an inclination of the optical axis as large as a maximum of 10 mmrad was measured. Meanwhile, as a result of performing a 10-mmrad correction for optical axis using the optical deflection unit 106, it was possible to end the processing, while holding the condensation position constant.

Third Embodiment

Figure 5:
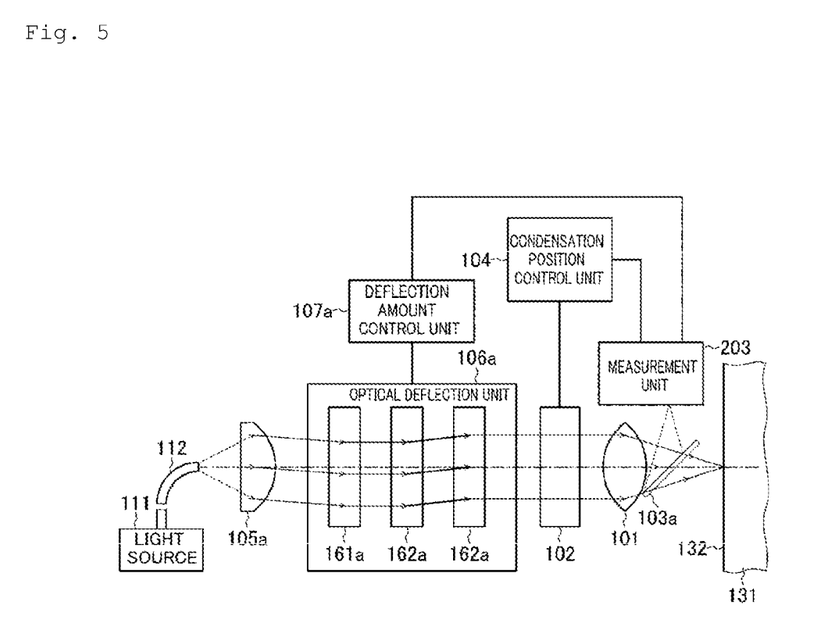
FIG. 5 is a configuration diagram illustrating a configuration of a laser processing device in a third embodiment of the present invention.

Next, referring to FIG. 5, a description will be given of a laser processing device in the third embodiment of the present invention. The laser processing device includes the condensing lens 101, the varifocal lens 102, the measurement unit 203, the condensation position control unit 104, the optical system 105, and the light source 111. The laser processing device also includes an optical deflection unit 106a and a deflection amount control unit 107a.

The condensing lens 101 condenses laser light supplied from the light source 111 onto the to-be-processed surface 132 of the structure 131 to be processed to irradiate the to-be-processed surface 132 of a structure 131 to be processed. The laser light supplied from the light source 111 passes through the optical fiber 112 to be optically shaped (into parallel beams) by the collimate lens 105a serving as the optical system and condensed by the condensing lens 101.

The varifocal lens 102 is disposed on the optical path of the condensing lens 101. The varifocal lens 102 is formed of, e.g., potassium tantalate niobate.

The optical deflection unit 106a deflects an optical axis of the laser light incident on the varifocal lens 102. In the third embodiment, the optical deflection unit 106a is configured to include optical deflectors 161a, 162a, and 163a made of an electro-optic crystal such as, e.g., potassium tantalate niobate, and a deflection amount can be changed (controlled) by applying a voltage thereto. The electro-optic crystal having an electro-optic effect (Kerr effect) rapidly operates in response to the applied voltage, has a high light transmittance, and is easy to cool.

The optical deflectors 161a, 162a, and 163a made of potassium tantalate niobate deflect light transmitted thereby through the voltage application, and do not need mechanical drive portions. Consequently, an optical system more compact and lighter in weight than when galvano mirrors or the like are used can be constructed. The optical deflection unit 106a thus configured allows the laser light incident on the varifocal lens 102 to be returned onto the optical axis in parallel relation with the optical axis. By using potassium tantalate niobate, it is possible to make a response of a millisecond or less and the optical axis can be adjusted in response to fast feedback control.

The measurement unit 203 includes the function of the condensation position measurement unit 103 in the first embodiment described above. In addition, the measurement unit 203 also has a function of an optical-axis-displacement measurement unit that measures a displacement amount of the optical axis of the laser light incident on the varifocal lens 102. For example, the measurement unit 203 uses the light extracted by the semireflecting mirror 103a to measure the position where condensation is caused by the condensing lens 101, and also measures the displacement amount of the optical axis. The measurement unit 203 includes, e.g., a two-dimensional image sensor, and measures the condensation position on the basis of an area of a beam diameter imaged by the image sensor. Alternatively, the measurement unit 203 measures the displacement amount of the optical axis of the laser light on the basis of a position where the beam diameter was imaged by the image sensor.

The condensation position control unit 104 controls the position of the varifocal lens 102 such that a difference between the condensation position measured by the measurement unit 203 and a prescribed condensation position that has been set falls within a set acceptable range in the same manner as in the first embodiment described above.

The deflection amount control unit 107a controls an amount of deflection caused by the optical deflection unit 106a such that the displacement amount of the optical axis measured by the optical-axis-displacement measurement unit falls within a set acceptable range for the displacement amount. The deflection amount control unit 107a varies voltages to be applied to the optical deflectors 161a, 162a, and 163a made of, e.g., potassium tantalate niobate to control the amount of deflection caused by the optical deflection unit 106a. Note that, as a method of measuring the shift amount of the condensation position and an angle θ (the displacement amount of the optical axis) between the optical axis and the laser light and a method of feedbacking the measured amount and the measured angle θ, any method may be used appropriately depending on a use purpose thereof.

According to the third embodiment described above, in the same manner as in the first and second embodiments described above, by using, e.g., a higher-output laser, a shift of the position where the laser light is condensed is inhibited even when the thermal lens effect is observed. In addition, by using the varifocal lens 102, it is possible to rapidly correct the condensation position. Consequently, in the third embodiment also, even when the higher-output laser is used, fine processing can easily be performed. In addition, the displacement of the optical axis due to the thermal lens effect can also be inhibited to allow a processing position to be more precisely controlled.

By way of example, a description will be given of a result of performing material processing using 20 kW laser light. In the processing, the varifocal lens 102 formed of potassium tantalate niobate was used. The focal distance of the condensing lens 101 was 50 mm, and the distance between the condensing lens 101 and the varifocal lens 102 was 10 mm. A voltage was applied such that the focal distance of the varifocal lens 102 was 4000 mm.

To deflect the laser light incident on the varifocal lens 102 and correct the optical axis displacement, the optical deflection unit 106a configured to include the three optical deflectors 161a, 162a, and 163a made of potassium tantalate niobate, the varifocal lens 102, and the condensing lens 101 are arranged in this order.

During a period of about 10 minutes after the processing was started, a displacement of the condensation position as large as a maximum of 2 mm was measured. By contrast, in the laser processing device according to the third embodiment, the feedback control changed the focal distance of the varifocal lens 102 from 4000 mm to 40 mm to allow the processing to be successfully ended, while constantly holding the focal position in an initial state. In addition, during the period of about 10 minutes after the processing was started, a maximum of 10 mmrad inclination of the optical axis was measured. By contrast, in the laser processing device according to the third embodiment, the optical deflection unit 106a made a 10-mmrad correction for optical axis to allow the processing to be successfully ended, while holding the condensation position constant.

Compared to a case where an optical deflection unit is formed of a galvano mirror, a cubic capacity of an optical system including the optical deflection unit 106 can be reduced by 30%, and a weight thereof can be reduced by 20%.

As described heretofore, according to embodiments of the present invention, the varifocal lens is disposed on the optical path of the condensing lens. Therefore, even when a higher-output laser is used, fine processing can easily be performed.

Note that the present invention is not limited to the embodiments described above. It would be obvious that numerous modifications and combinations can be made by a person having ordinary skill in the art within the technical idea of the present invention.

Reference Signs List
101 Condensing lens
102 Varifocal lens
103 Condensation position measurement unit
103a Semireflecting mirror
104 Condensation position control unit
105 Optical system
111 Light source
112 Optical fiber
131 Structure
132 To-be-processed surface
151, 152 Lens
153 Collimate lens

The invention claimed is:

1. A laser processing device comprising:
a condensing lens configured to condense laser light supplied from a light source onto a surface of a structure to irradiate the surface of the structure;
a varifocal lens disposed on an optical path of the condensing lens;
a condensation position measurement device configured to measure the laser light at a position between the condensing lens and the structure and measure a condensation position where the laser light is condensed by the condensing lens based on the laser light measured at the position between the condensing lens and the structure; and
a condensation position controller configured to control a focal position of the varifocal lens such that a difference between the condensation position measured by the condensation position measurement device and a prescribed condensation position falls within a first preset acceptable range.

2. The laser processing device according to claim 1, wherein the varifocal lens comprises an electro-optic crystal, and wherein the condensation position controller applies a voltage to the varifocal lens to control the focal position.

3. The laser processing device according to claim 1, further comprising:
an optical deflector configured to deflect an optical axis of the laser light incident on the varifocal lens;
an optical-axis-displacement measurement device configured to measure a displacement amount of the optical axis of the laser light incident on the varifocal lens; and
a deflection amount controller configured to control an amount of deflection caused by the optical deflector such that the displacement amount of the optical axis measured by the optical-axis-displacement measurement device falls within a second preset acceptable range of the displacement amount.

4. The laser processing device according to claim 3, wherein the optical deflector comprises a reflecting mirror having a variable angle, and wherein the deflection amount controller is configured to vary the variable angle of the reflecting mirror to control the amount of deflection caused by the optical deflector.

5. The laser processing device according to claim 3, wherein the optical deflector comprises a galvano mirror, and wherein the deflection amount controller is configured to apply a current to the optical deflector to control the amount of deflection caused by the optical deflector.

6. The laser processing device according to claim 3, wherein the optical deflector comprises an electro-optic crystal, and wherein the deflection amount controller is configured to apply a voltage to the optical deflector to control the amount of deflection.

7. A method of operating a laser processing device, the method comprising:
condensing, by a condensing lens of the laser processing device, laser light supplied from a light source onto a surface of a structure to irradiate the surface of the structure, wherein the laser processing device comprises a varifocal lens disposed on an optical path of the condensing lens;
measure the laser light at a position between the condensing lens and the structure;
measure, by the laser processing device, a condensation position where the laser light is condensed by the condensing lens based on the laser light measured at the position between the condensing lens and the structure; and controlling, by the laser processing device, a focal position of the varifocal lens such that a difference between the condensation position and a prescribed condensation position falls within a first preset acceptable range.

8. The method according to claim 7, wherein the varifocal lens comprises an electro-optic crystal, and wherein a voltage is applied to the varifocal lens to control the focal position.

9. The method according to claim 7 further comprising:

deflecting, by an optical deflector of the laser processing device, an optical axis of the laser light incident on the varifocal lens;

measuring a displacement amount of the optical axis of the laser light incident on the varifocal lens; and controlling an amount of deflection caused by the optical deflector such that the displacement amount of the optical axis falls within a second preset acceptable range of the displacement amount.

10. The method according to claim 9, wherein the optical deflector comprises a reflecting mirror having a variable angle, and wherein controlling the amount of deflection comprises varying the variable angle of the reflecting mirror to control the amount of deflection caused by the optical deflector.

11. The method according to claim 9, wherein the optical deflector comprises a galvano mirror, and wherein controlling the amount of deflection comprises applying a current to the optical deflector to control the amount of deflection caused by the optical deflector.

12. The method according to claim 9, wherein the optical deflector comprises an electro-optic crystal, and wherein controlling the amount of deflection comprises applying a voltage to the optical deflector to control the amount of deflection.

* * * * *